Oct. 5, 1926.

H. W. TOBEY

LINE WELDING

Original Filed August 27, 1923  2 Sheets-Sheet 1

Inventor:
Harry W. Tobey,
by
His Attorney

Oct. 5, 1926.

H. W. TOBEY 1,601,929

LINE WELDING

Original Filed August 27, 1923   2 Sheets-Sheet 2

Inventor:
Harry W. Tobey
by
His Attorney

Patented Oct. 5, 1926.

1,601,929

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

LINE WELDING.

Original application filed August 27, 1923, Serial No. 659,462. Divided and this application filed January 5, 1925. Serial No. 507.

My invention relates to line welding machines wherein means are provided for producing relative movement between the work and the electrodes through which electric current is transmitted to the metal of the weld, and has for its object the provision of means for correcting the tendency of the work to creep or move in a direction transverse to the line of the weld and for controlling the movement of the electrodes to secure welding in a desired line.

In the resistance line welding of metal parts, difficulty is sometimes encountered due to the tendency of the work to creep in a direction transverse to the line of the weld. Creeping of the work may be produced in different ways, as by springing of one of the electrodes for example, and, when once initiated, is likely to continue. If some arrangement is provided which prevents movement of the work in a direction transverse to the line of the weld, creeping of the work may be prevented but only at the expense of subjecting the electrode to a considerable strain which reduces the length of time the electrode may be used without redressing. It is therefore desirable that some means be provided for producing forces of such a magnitude and direction as to neutralize the effect of the forces tending to produce creepage of the work without subjecting the electrodes to undue strain. In accordance with my invention, this result is accomplished by angular adjustment of the axis of one of the electrodes, or of the axis of a disk arranged to engage the work for the purpose of producing relative movement between the electrodes and work.

This application is a division of my application for Letters Patent of the United States, Serial No. 659,462 which was filed August 27, 1923, and is assigned to the same assignee as the present application.

My invention will be better understood from the following description when considered in connection with the accompanying drawing and its scope will be pointed out in the appended claims.

Figure 1:
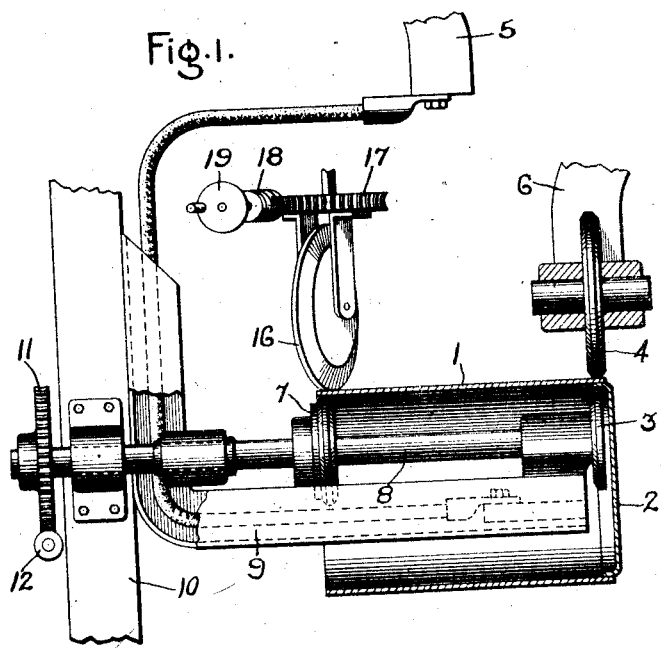
Figure 2:
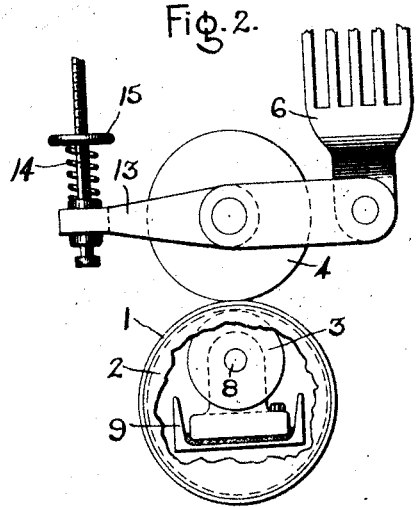
Figure 3:
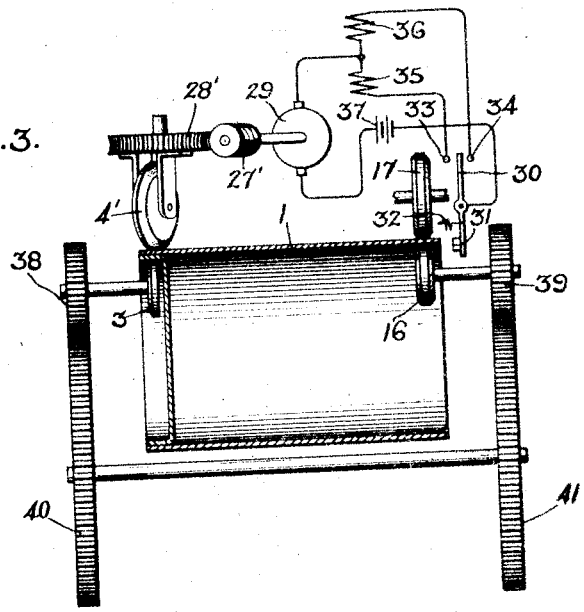
Figures 4, 5:
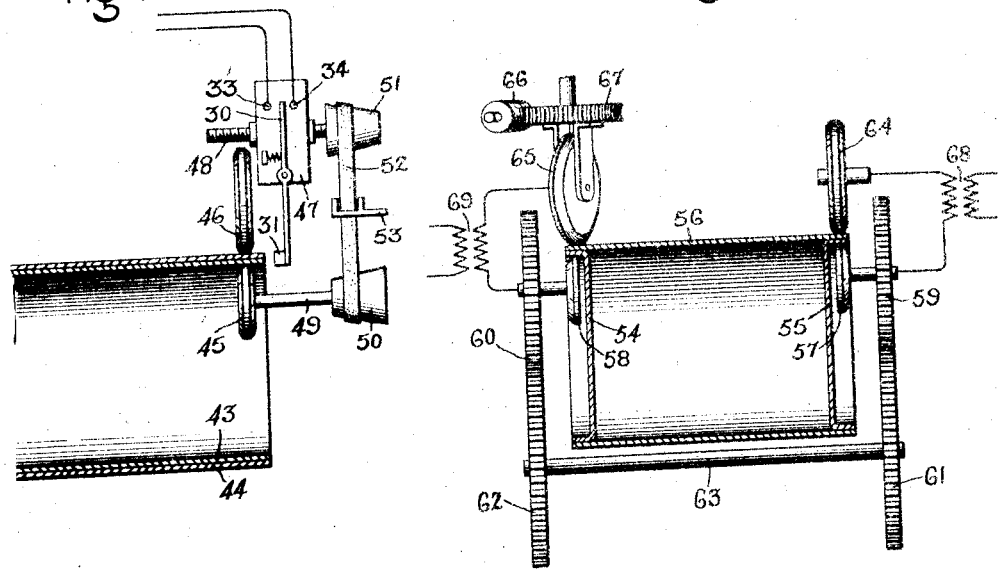

Referring to the drawing, Figs. 1 and 2 show an arrangement comprising means whereby the tendency of the work to creep may be corrected; Fig. 3 shows an automatic means for correcting any tendency of the work to creep; Fig. 4 shows a modification of the arrangement shown by Fig. 2, and Fig. 5 shows an arrangement for welding both heads of a drum simultaneously.

Referring to Figs. 1 and 2, the work is illustrated as a drum 1 to which a head 2 is to be welded by current supplied from a suitable source, such as a transformer for example, through electrodes 3 and 4 and leads 5 and 6. The electrode 3, together with a contact disk 7, is mounted on a shaft 8 which is shown as supported at one end by a bearing mounted on the member 9 and at the other end by a bearing mounted on the member 10. The member 10 is also utilized to support the member 9. A gear 11 mounted on the end of the shaft 8 may be driven through a worm 12 in any suitable manner to produce rotation of the electrode 3 and the contact disk 7. As indicated by Fig. 2, the electrode 4 may be mounted on an arm 13 which is hinged or pivoted to the lead 6 at one end and at the other end is provided with a spring 14 and handwheel 15 for producing suitable pressure between the electrodes 3 and 4.

In order to control the line of the weld and prevent creepage of the work, a contact disk 16 which cooperates with the contact disk 7 is arranged to have its axis angularly adjusted by means of worm gear 17, worm 18 and hand-wheel 19. Any tendency of the work to creep may be overcome by slight angular adjustment of the disk 16. The movement of the work may thus be readily controlled to produce a weld along a desired line.

Fig. 3 shows means for automatically preventing creeping of the work. In this embodiment of the invention, the electrode 4' is arranged to be adjusted angularly. The angular position of this electrode is controlled by the motor 29 driving the worm wheel 28' through the worm 27'. The operation of the motor is controlled by a suitable circuit controlling contact 30 carrying a shoe or roller 31 adapted to be pressed against the edge of the work by spring 32. When the work tends to move laterally the contact 30 will engage either the contact 33 or the contact 34 to cause the motor 29 to rotate in one direction or the other. In the arrangement diagrammatically indicated the contacts 33 and 34 are connected to the reversely wound motor field windings 35 and 36. The motor 29 may be supplied from any suitable source indicated for simplicity as a battery 37.

Fig. 3 shows the electrode 3 and roll 16 as driven by gears 38 and 39 respectively engaged by gears 40 and 41 mounted on a shaft 42, which may be driven by any suitable power operated means.

The operation of the arrangement shown in Fig. 3 will be obvious from what has been heretofore set forth. When the work is in the proper position with respect to the electrodes, the contact 30 will lie in between the contacts 33 and 34 and the motor 29 will stand still. If the work tends to move endwise one way or the other, the motor 29 will be energized and operated in the proper direction to adjust the angular position of the electrode 4′ so as to correct the tendency of the work to creep endwise. It is apparent that the roller 31 may be arranged to engage either end of the drum or may be arranged to engage a guiding flange which may be clamped in any desired position to the drum. Where a separate flange is clamped on in the manner indicated, it is apparent that the line of the weld will be governed by the contour of the flange which may be predetermined to give any desired line of weld. The application of the invention is not limited to circumferential welding since the same arrangement may be applied to the welding of flat work in which case the shoe or roller 31 will engage either the edge of one of the sheets to be welded or a guiding flange suitably clamped to one of the sheets.

In certain cases the production of a spiral weld may be desirable. Fig. 4 illustrates how the automatic arrangement of Fig. 3 may be arranged so as to produce a spiral weld of any desired pitch. In Fig. 4 the work is indicated as comprising two drums or shells 43 and 44 which are to be welded together by a spiral weld. 45 and 46 indicate either a pair of electrodes or a pair of guiding rolls. The contact-making device comprising the contacts 30, 33 and 34 and the shoe or roll 31 is in this case shown as comprising a member 47 arranged to be moved longitudinally by means of a screw 48 driven by means of adjustable speed gearing from the shaft 49 upon which the roll 45 is mounted. The adjustable speed gearing shown comprises a cone pulley 50 on the shaft 49 and a cone pulley 51 driving the shaft 48 and a belt 52, the position of which along the pulleys may be adjusted by any suitable means 53.

The operation of the arrangement shown in Fig. 4 would be the same as the operation of the arrangement shown in Fig. 3 if the screw 48 did not turn. Since, however, this screw is driven from the shaft 41 it follows that the device 47 carrying the contact shoe or roller 31 moves longitudinally over the surface of the drum. This causes the motor controlled by the contacts 30, 33 and 34 to adjust the angular position of the roll controlling creeping so as to cause the work to move endwise thus producing a spiral line of weld. The pitch of the spiral is dependent upon the speed relationship between the shafts 48 and 49 and by adjusting the belt 52 along the faces of the cone pulleys 50 and 51 this speed relationship may be adjusted to give the desired pitch.

Fig. 5 shows a modification of my invention in which the two ends 54 and 55 are arranged to be simultaneously welded into the drum 56. The inside electrodes 57 and 58 are indicated as driven by the gears 59 and 60 driven by the gears 61 and 62 mounted on the shaft 63 which is driven by suitable power operated means. The outside electrodes are shown at 64 and 65 and the angular position of the electrode 65 is shown as adjustable by means of the worm 66 and worm wheel 67 which may be controlled as in the arrangement of Figs. 3 or 4. A transformer 68 is indicated for supplying current to the electrodes 64 and 57 and a transformer 69 is indicated for supplying current to the electrodes 65 and 58. Suitable insulation will in all cases be provided for confining the current to the desired path in a manner well known in the art.

It will be obvious to those skilled in the art that many modifications and variations of the arrangements shown are possible and in the appended claims I intend to cover all such modifications as fall within the true spirit of my invention.

What I claim as new and desire to secure by Letters Patent of the United States, is:—

1. A welding machine comprising a pair of electrodes adapted to engage opposite sides of the work and conduct welding current therethrough, means for producing relative motion between the electrodes and work to produce a line weld, means for controlling the line of the weld comprising a pair of disks arranged to roll in contact with opposite sides of the work and means whereby the axis of rotation of one of said disks may be adjusted to impart relative movement between the electrodes and the work in a line transverse to the line of the weld.

2. In a welding machine as claimed in claim 1, the combination of means arranged to be controlled by movement of the work with respect to the electrodes for automatically adjusting the axis of the disk controlling the line of the weld.

3. A welding machine of the type wherein a pair of rotatable disk electrodes are arranged to engage with opposite sides of the work and conduct welding current therethrough and wherein means are provided for producing relative movement between the electrodes and work to produce a line weld, characterized by the fact that means are provided for automatically controlling the line of the weld comprising means arranged to engage an edge of the work and means controlled thereby for imparting relative movement between the electrodes and work in a line transverse to the line of the weld.

4. In a welding machine comprising a pair of rotatable disk electrodes arranged to engage opposite sides of the work and conduct welding current therethrough, the combination of means for driving one of said electrodes to produce relative movement between the work and the electrodes to produce a line weld, means for angularly adjusting the axis of rotation of one of said electrodes to impart relative movement between the electrodes and work in a line transverse to the line of the weld, and means for automatically controlling the angular adjustment comprising a device engaging the work and arranged to vary the adjustment in accordance with relative movement between said device and the work in a direction transverse to the line of the weld.

5. In a welding machine as claimed in claim 4, the combination of means whereby the position of the work engaging device may be adjusted to control the line of the weld.

6. A welding machine for producing circumferential welds in curved work comprising a pair of rotatable disk electrodes for engaging opposite sides of the work and conducting welding current therethrough, means for rotating one of the electrodes to produce relative movement between the work and electrodes to effect a line weld, means whereby the axis of rotation of one of the electrodes may be angularly adjusted, a device controlled by the work for controlling the angular adjustment and means for adjusting the position of said device in accordance with the rotation of the electrodes to produce a spiral weld.

7. In a welding machine a rotatable disk electrode arranged to engage the work and conduct welding current therethrough, means for producing relative motion between said electrode and the work to produce a line weld, and means for angularly adjusting the axis of rotation of said electrode while welding to control the line of the weld.

In witness whereof, I have hereunto set my hand this 31st day of December, 1924.

HARRY W. TOBEY.